(12) United States Patent
Kolli et al.

(10) Patent No.: US 6,442,584 B1
(45) Date of Patent: Aug. 27, 2002

(54) METHODS FOR RESOURCE CONSOLIDATION IN A COMPUTING ENVIRONMENT

(75) Inventors: Ratnakar Kolli, Sunnyvale; Marc Sugiyama, Richmond, both of CA (US); Garudapura S. Madhusudan, Redmond, WA (US); Steven Grady, San Francisco, CA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/079,867

(22) Filed: May 15, 1998

Related U.S. Application Data

(60) Provisional application No. 60/046,757, filed on May 16, 1997.

(51) Int. Cl.[7] ................................................ G06F 9/00
(52) U.S. Cl. .................................... 709/104; 709/106
(58) Field of Search ................................. 709/100–108; 717/1, 5; 345/853; 370/351

(56) References Cited

U.S. PATENT DOCUMENTS

| | | | |
|---|---|---|---|
| 4,799,254 A | | 1/1989 | Dayton et al. |
| 5,247,634 A | | 9/1993 | Cline et al. |
| 5,291,399 A | | 3/1994 | Chaco |
| 5,467,268 A | | 11/1995 | Sisley et al. |
| 5,467,343 A | | 11/1995 | Lee et al. |
| 5,574,911 A | * | 11/1996 | D'Angelo et al. .............. 707/1 |
| 5,623,492 A | | 4/1997 | Teraslinna |
| 5,664,228 A | | 9/1997 | Mital |
| 5,671,361 A | | 9/1997 | Brown et al. |
| 5,671,404 A | | 9/1997 | Lizee et al. |
| 5,684,994 A | * | 11/1997 | Tanaka et al. .................. 717/5 |
| 5,708,798 A | | 1/1998 | Lynch et al. |
| 5,742,772 A | | 4/1998 | Sreenan |
| 6,212,668 B1 | * | 4/2001 | Tse et al. ....................... 716/7 |

OTHER PUBLICATIONS

Zondag "Hierarchical Management of Distributed Objects" University of Twente, Department of Computer Science, Nov. 1990.*

* cited by examiner

Primary Examiner—St. John Courtenay, III
Assistant Examiner—Van H. Nguyen
(74) Attorney, Agent, or Firm—John A. Smart

(57) ABSTRACT

A resource methodology is described which provides a framework for defining specific resource classes support for resource methods, and provides support for resource-independent commands, including those used in resource consolidation. A Resource Consolidation methodology of the present invention works by starting with an empty resource set, then iteratively extends the set in a minimal fashion. At the end of the iteration, the initial resource set comprises sufficient resources. An important component to this approach is a Minimal Extension method. This method provides a directed, acyclic graph methodology that takes two graphs as input and extends one (the "primary") so as to include the other one (the "secondary"). For efficiency, resources in the secondary graph are shared with those in the primary graph wherever possible.

29 Claims, 9 Drawing Sheets

DIFFERENT NODE CLASSES

THE CONTAIN/USE DISTINCTION IS IRRELEVANT IN PRIMARY

PRIMARY                SECONDARY

METHODS FOR RESOURCE CONSOLIDATION IN A COMPUTING ENVIRONMENT

RELATED APPLICATIONS

The present application claims the benefit of priority of commonly-owned provisional application serial No. 60,046,757, filed May 16, 1997, and entitled, METHODS FOR RESOURCE CONSOLIDATION IN A COMPUTING ENVIRONMENT, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to methodologies for consolidating resources in processing environments, such as a networked environment operating SQL database servers.

Computers are very powerful tools for storing and providing access to vast amounts of information. For instance, computer database servers are a common mechanism for storing information on computer systems while providing easy access to users. To support multiple clients concurrently accessing the system, the system must employ some sort of mechanism for managing its resources—that is, the devices, software, services, and subsystems which comprise the system. One approach is to provide resource management groups which are hierarchically formed. For instance, each resource management group may include a resource management process for managing resources allocated to its group, at least one process which is a descendant of the resource management process and not included in other resource management groups, and a resource management block for storing information on the resources managed by its own group. The resource management processes can be linked to each other in accordance with parent-child relationships between the respective resource management groups to form a resource management tree.

Each day more and more businesses are run from mission-critical systems which store information on resource-intensive systems, such as server-based SQL database systems. As a result, increasingly higher demands are being placed on those systems to provide enterprise-wide decision support. Accordingly, there is much interest in improving the performance of such system, particularly in terms of resource management. Accordingly, there is much interest in improving methodologies for managing and consolidating resources.

SUMMARY OF THE INVENTION

The present invention comprises a resource methodology which provides a framework for defining specific resource classes support for resource methods, and provides support for resource-independent commands, including those used in resource consolidation.

A Resource Consolidation methodology of the present invention works by starting with an empty resource set, then iteratively extends the set in a minimal fashion. At the end of the iteration, the initial resource set comprises sufficient resources. An important component to this approach is a Minimal Extension method. This method provides a directed, acyclic graph methodology that takes two graphs as input and extends one (the "primary") so as to include the other one (the "secondary"). For efficiency, resources in the secondary graph are shared with those in the primary graph wherever possible.

The intent of the method is to add the contents of the secondary graph to the primary graph, sharing nodes wherever the graphs are compatible, while retaining the topology of the secondary graph, and doing so in a minimal amount of time. The Minimal Extension methodology is itself composed of submethods or sub-algorithms. The method iterates through each node in the secondary graph, and extends the primary if necessary to contain the node, using an Extend method. Extend first checks if the given node is compatible with a node in the primary. If not, it adds the node to the primary. These two steps (i.e., checking compatibility, and adding to the primary) would be easy if they did not have edges coming out of them, but since they may have edges, both of these methods are made more complicated.

A compatibility check, called Unify, checks not only the node itself but any descendants of the node. Unify compares the node against each node in the primary, invoking a Compare function. Compare first checks that the nodes are directly compatible (ignoring any descendants), then recursively invokes Compare to check whether the descendants are compatible between the two graphs. When Unify finds a compatible subgraph (a subgraph is a node plus its descendants), it returns. A graph addition algorithm, Add, is invoked if the node is not found to be compatible. It copies the node from the secondary graph to the primary graph, then minimally extends the primary graph to include the node's descendants, and finally adds the edges from the current node to the resulting nodes in the subgraph. Note that due to the minimal extension of the descend ants, Add is also recursive.

DETAILED DESCRIPTION OF A PREFERRED EMBODIMENT

System Hardware

Figure 1:
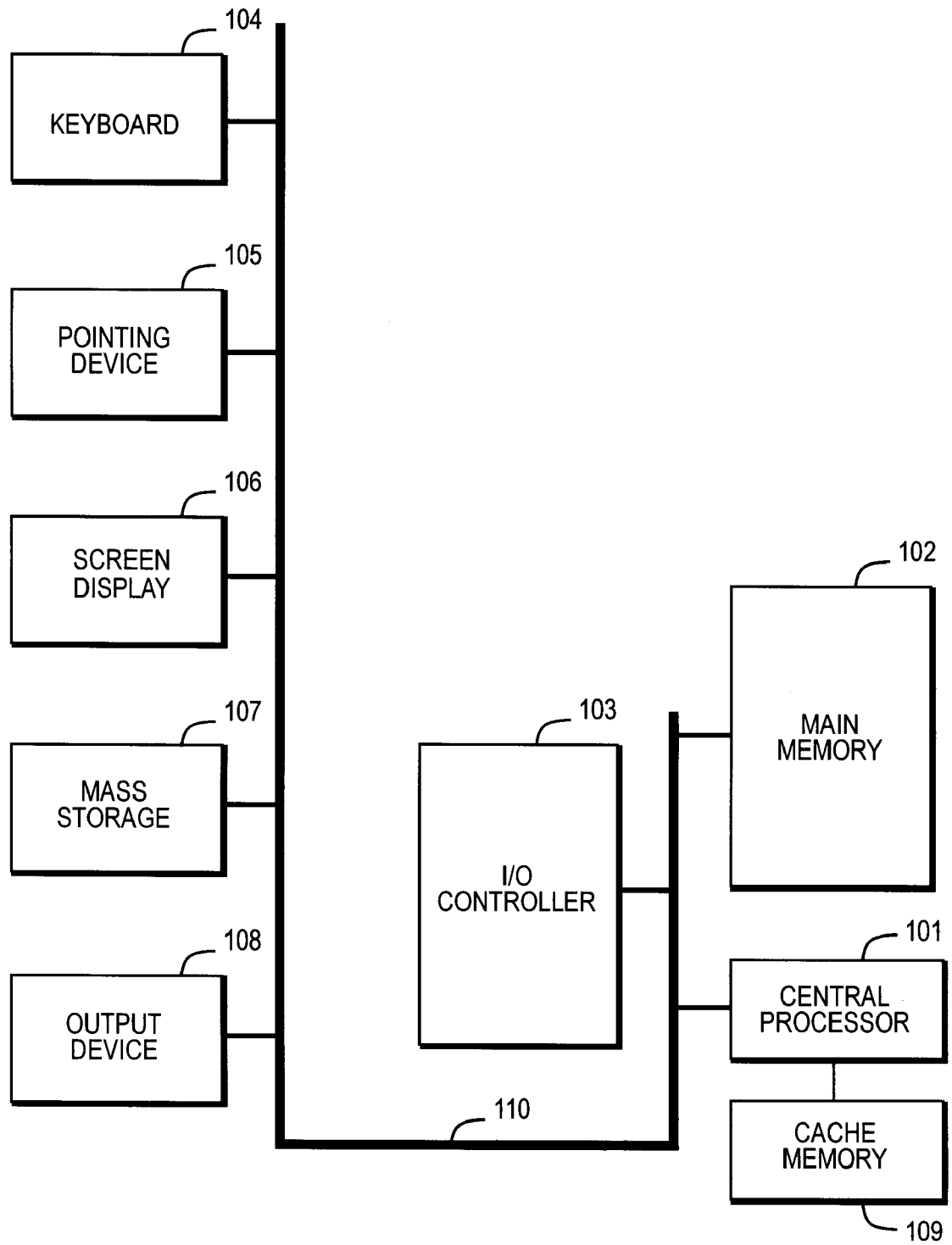
FIG. 1 is a block diagram illustrating a computer system in which the present invention may be embodied.

The invention may be embodied on a computer system such as the system 100 of FIG. 1, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. The system 100 may include, for instance, an IBM-compatible personal computer system, available from a variety of vendors (including IBM of Armonk, N.Y.).

Resource Consolidation in a Computing Environment

A. Introduction

The present invention comprises a computer-implemented (i.e., implemented in system 100) resource methodology which provides a framework for defining specific resource classes support for resource methods, and provides support for resource-independent commands, including those used in resource consolidation. Of the above features, the resource consolidation is the most complex in design.

B. Overview of Resource Consolidation Methodology

The Resource Consolidation methodology works by starting with an empty resource set, then iteratively extends the set in a minimal fashion. At the end of the iteration, the initial resource set comprises sufficient resources. An important component to this approach is a Minimal Extension method. This method provides a directed, acyclic graph methodology that takes two graphs as input and extends one (the "primary") so as to include the other one (the "secondary"). For efficiency, resources in the secondary graph are shared with those in the primary graph wherever possible.

Figure 2:
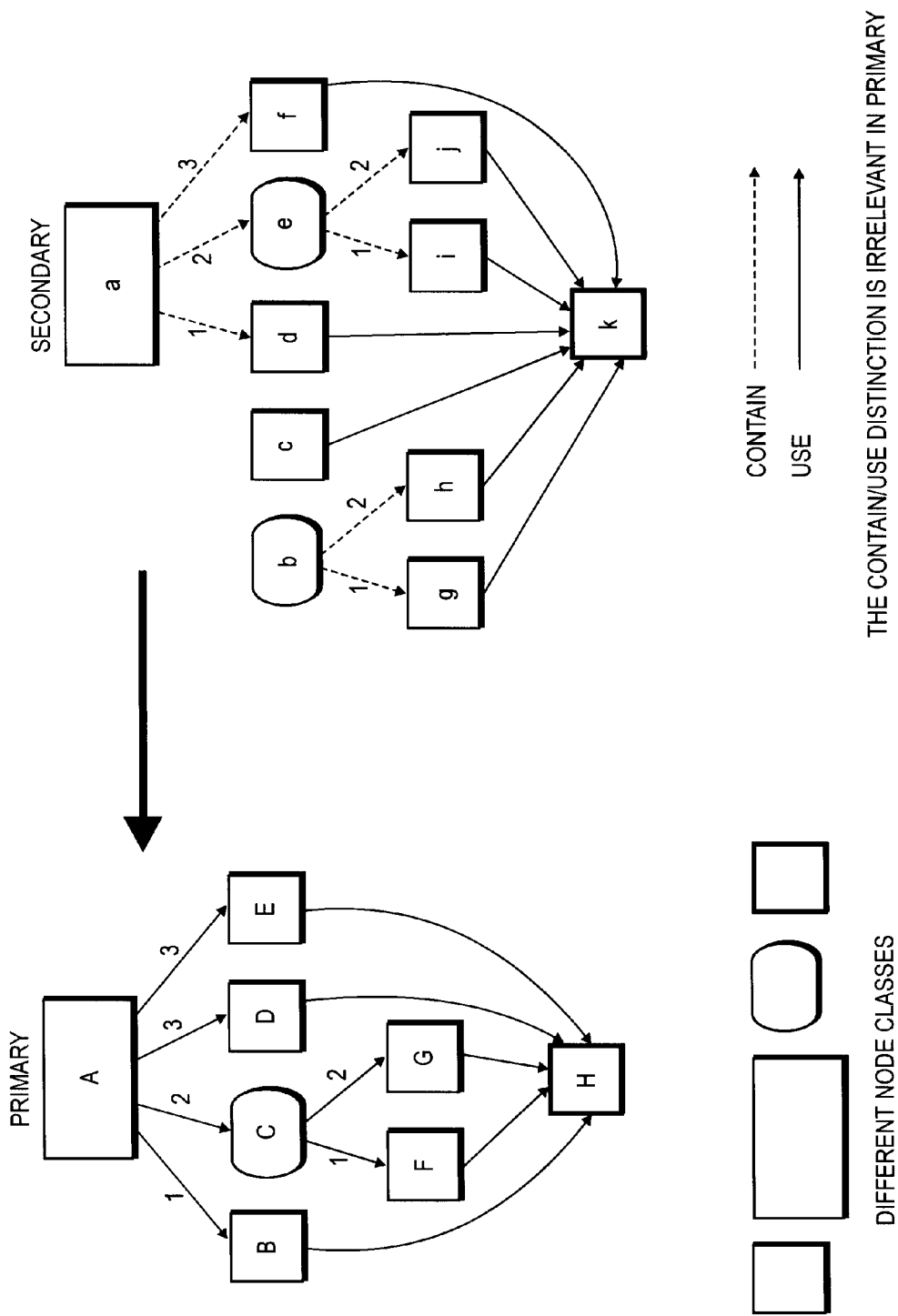
FIGS. 2–6 are diagrams of directed graphs, providing examples of operation of the resource consolidation methodology of the present invention.

The following discussion will refer to the graphs shown in FIG. 2. Numbers are edge labels. Edges from a node with only one child are unlabeled. The intent of the method is to add the contents of the secondary graph to the primary graph, sharing nodes wherever the graphs are compatible, while retaining the topology of the secondary graph, and doing so in a minimal amount of time. The Minimal Extension methodology is itself composed of submethods or sub-algorithms. The method iterates through each node in the secondary graph, and extends the primary if necessary to contain the node, using an Extend method. Extend first checks if the given node is compatible with a node in the primary. If not, it adds the node to the primary. These two steps (i.e., checking compatibility, and adding to the primary) would be easy if they did not have edges coming out of them, but since they may have edges, both of these methods are made more complicated.

The compatibility check, called Unify, checks not only the node itself, but any descendants of the node. Unify compares the node against each node in the primary, invoking a Compare function. Compare first checks that the nodes are directly compatible (ignoring any descendants), then recursively invokes Compare to check whether the descendants are compatible between the two graphs. When Unify finds a compatible subgraph (a subgraph is a node plus its descendants), it returns.

A graph addition algorithm, Add, is invoked if the node is not found to be compatible. It copies the node from the secondary graph to the primary graph, then minimally extends the primary graph to include the node's descendants, and finally adds the edges from the current node to the resulting nodes in the subgraph. Note that due to the minimal extension of the descendants, Add is also recursive.

There are a number of factors that complicate this approach. One is that the information in the graphs is richer than that described above. Each edge has a label, and each node has a class. Multiple descendants of a node may have the same label. Each node in a class is guaranteed to have the same labeled edges, although the number of edges with a given label may be different for different classes. For instance, both a and A have edges labeled 1, 2, and 3, although A has two edges labeled 3. Compare must ensure that the classes and labels are compatible. Thus, a and A might match because they are of the same class, but b and C are definitely not compatible. All this information complicates the approach, but actually improves the running time, since it can be used to filter out nodes without doing a full node comparison.

Another factor is that if the secondary graph has multiple subgraphs that are compatible with one subgraph in the primary, then the above description might result in the secondary subgraphs being mapped onto the same subgraph in the primary, which is not what is desired. For instance, the subgraphs rooted at b and e might both be compatible with the graph rooted at C. But when Extend is complete, only one of the two is desired to be mapped to C. The method must track which primary nodes have already been mapped, so as to avoid mapping multiple objects in the secondary onto the same object in the primary.

Similarly, once a node has been mapped from the secondary to the primary, the method should record all of the descendant mappings. Otherwise, when the method completes, the secondary graph's topology may be lost. For instance, suppose a has been mapped to A. The process of doing the comparison should record the mappings of the entire subgraph; otherwise, d could be mapped to E, which is wrong since the edge labels would no longer be consistent (a->d is 1, but A->E is 3). To avoid this situation, the method tracks which secondary nodes have already been mapped.

The above two points lead to the requirement for a bidirectional mapping, or unification. When two nodes are found to be compatible, they are bound together, and are said to be "unified" for the time required to complete the Minimal Extension method. This mapping takes place during the Unify method.

Complicating the whole procedure further is the fact that the edges between two nodes are one of two types, use or contain. A contain relationship means that if the node is copied, than the descendant tree must also be copied. A use relationship means that even if the node is copied, it may still be possible to share the descendants with the Extend method. For example, once b is determined not to fit into the primary, g and h will need to be copied (because they are contained), but k is still a candidate for unification (because it is used). If in fact a had already been mapped to A, then k will already be mapped to H, and therefore when b's subgraph is added, it will already have a constraint on it.

Another problem which exists is that the number of node comparisons in the method, as described above, represents the worst case. Consider, for instance, that Extend may recursively call itself for each descendant. For instance, to compare a with A, all six of a's descendants must be compared to those of A. Suppose that during the Compare, k is found to be compatible with H, but something else is incompatible. Therefore a's subgraph will be added to the primary with Add. However, since Add recursively calls Extend when descendants are used, k will again be compared with H, even though it had already been compared. Consider further that Minimal Extension calls Extend once for each node. Clearly, the approach should avoid re-comparing nodes. It is also important not to compare against the newly added nodes when comparing later nodes in the same graph. That is, if Extend copies g to the primary graph, C should not be compared with g's copy later on. Another consideration is that the order in which the nodes are traversed matters. If b is checked before a, then b could get mapped to C. Therefore, when a is checked against A, C will not be available, and so a will have to be added as a new subgraph. The resulting extension could be sub-optimal. The method can avoid this problem, however, by comparing the nodes in the correct order.

Finally, consider the following situation: b is being compared to C, and it has been determined that b is compatible with C, g is compatible with F, and k is compatible with H. Suppose that it is now desired to compare h to G. In such a case, the system needs to remember that k has been mapped to H, because that mapping affects the topology. That is not a problem if the mappings are recorded as they take place. Consider the case, however, when h turns out to be incompatible with G. Recall that the purpose of mappings that are recorded is track the unification of two subgraphs. Since this occurs within Compare, the system has determined that the subgraphs are incompatible, and does not want to do the unification at all. In such a case, the mapping from k to H is removed, since it was only conditional on b's being mapped to C. The method must, therefore, be able to record potential mappings, but must be able to back out of those mappings if Compare rejects the possible unification.

To address these issues, implementation of the method is complicated. Specifically, the following features are introduced.

(1) A bi-directional unification record is added between the nodes of the primary and secondary graphs. This record serves two purposes: it ensures that the topology is handled correctly, as mentioned in the points above; and it provides coloring for the nodes, reducing the algorithm to linear time (2) A check is added in Add to determine whether an edge is used or contained, resulting in the appropriate subgraph being handled with either Extend or Add, respectively.

(3) A cache is kept of the results of node comparisons, preventing repeated comparisons of the same nodes.

(4) A predefined order is employed for comparing classes of nodes, improving the likelihood that the classes with more descendants will get mapped first.

(5) A set of virtual bindings is employed, which stores potential mappings during Compare. If the Compare is successful, the virtual bindings are converted into real bindings.

C. Method Steps for Implementing Resource Consolidation Methodology

The methodology may be implemented as outlined below. Each method (with its routine names presented in parentheses) is followed by exemplary method steps.

Resource Consolidation (consolidate):
  For each resource set:
    Invoke Minimal Extension on the set Minimal Extension (extend):
  Initialize the nodes in the resource set
  For each resource in the set, iterating through in tcf_ hierarchy order:
    Invoke Extend on the resource
  Clean up Extend (extend resource)
  Try to Unify the resource, record the result in mapped_ res (i.e., mapped resource)
  If Unify failed, copy the subgraph rooted at the resource with Add, saving the result in mapped_res
  Return mapped_res Unify (unify_resource)
  If resource is already bound, return binding
  For each primary resource in the same class as the secondary resource:
    Remove all the virtual bindings (this_merge_list, reset_merge_list)
    Call Compare to compare the primary and secondary resources
    If they match, call Bind to bind the two resources together, and return the primary resource
  If no primary resource matches, return a failure Compare (compare)
  If the primary resource is already bound:
    Set map to the binding
    If map equals the secondary resource, return success, since the two resources are already bound together
    Otherwise, return failure, since the primary resource is bound to something else
  If the primary resource is not yet, bound:
    If the secondary resource is bound, then return failure, since it must be bound to something other than the primary resource
  Repeat the above steps by checking for bindings on the virtual list
  If neither the primary nor secondary resources are yet bound, in either the real or the virtual list, invoke Compare 1 to actually compare the two resources Compare1(compare1)
  If the comparison between the primary and secondary resources has already taken place, then get the result from the cache
  Otherwise, do the node comparison, and store the result in the cache; the node comparison assumes that the two nodes being compared are in the same class If the two nodes are not compatible, return failure
  Otherwise, for each type of edge label descending from the primary node:
    Invoke Compare on the children of the primary and secondary resource with the specified label
    If the Compare fails, return failure
  The primary resource and secondary resource are compatible, as are their descendants.
  Create a virtual binding between the two resources.

Figure 3:
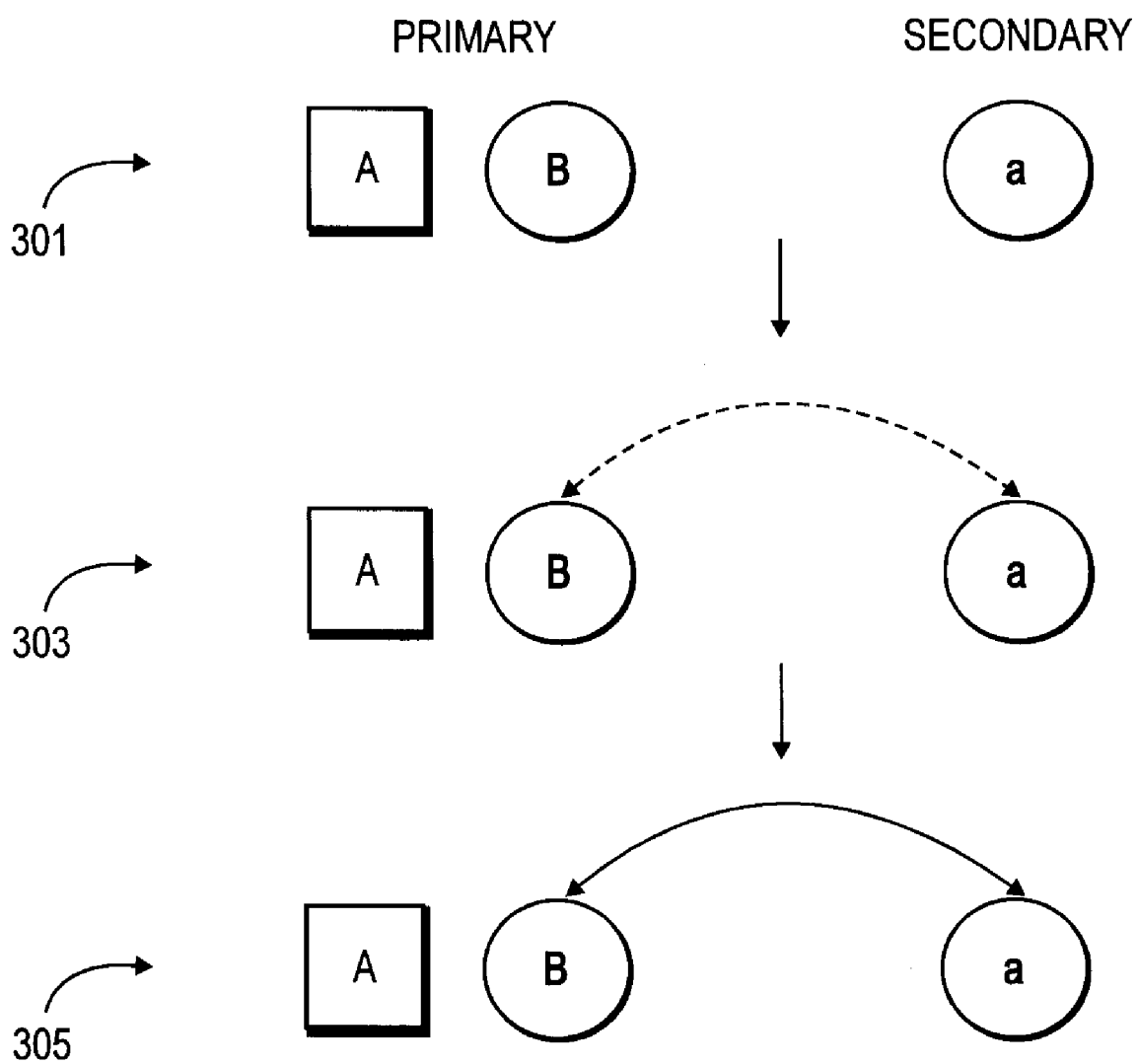

Bind (do_merge)
  For each binding in the virtual bindings list:
    Do any resource-specific merging of the two resources
    Call BindResource to bind the two resources to each other Add (add_resource_tree)
  Create a new node that is an exact copy of the node in the secondary graph
  Create a real binding between the original, secondary resource and the new, primary resource
  For each contained edge label of the original resource's class:
    For each child connected to the original resource through the specified label:
      Invoke Add to add the child, recording the name of the resulting copy Change the links in the copy to point to the copies of the children
For each used edge label of the original resource's class:
   For each child connected to the original resource through the specified label:
      Invoke Extend to unify or add the child, recording the name of the resulting binding
   Change the links in the copy to point to the bindings of the children
Return the name of the copy BindResource (bind_resource)
Bind the first resource to the second resource
Bind the second resource to the first resource D. Examples of Minimal Extension As an example, consider the following scenario, which is illustrated in FIG. 3. As shown at 301, the primary set consists of two nodes, A and B. The secondary set consists of one node, a. The a node is compatible with B. As illustrated at 303, Minimal Extension calls Extend(a). Extend calls Unify(a). Unify clears any virtual bindings, then looks at B, which is the same class as a, and calls Compare(B, a). Compare calls Compare1(B, a). Compare1 invokes B's node comparison function, and determines a is compatible. It creates a virtual binding between B and a.

As illustrated at 305, Unify then calls Bind. Bind finds the virtual binding, invokes B's merge function to merge a, and calls BindResource(B, a). BindResource makes a real binding. Unify(a) returns B. Extend(a) returns B. Minimal Extension cleans up, and is finished. The result is that a has been bound to B.

Figure 4:
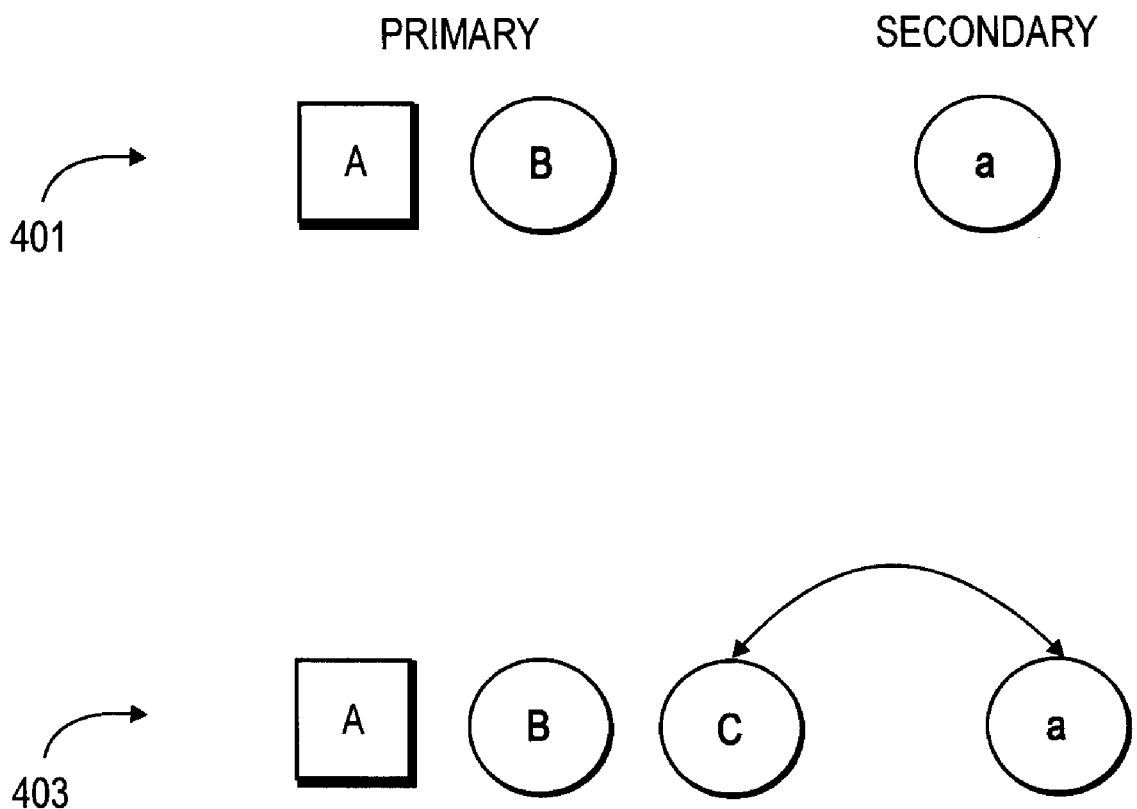

FIG. 4 illustrates a more complicated example. Consider the same situation, as shown at 401, but a is not compatible with B. Minimal Extension calls Extend(a) Extend calls Unify(a). Unify clears any virtual bindings, then looks at B, which is the same class as a, and calls Compare(B, a). Compare calls Compare1(B, a). Compare1 invokes B's node comparison function, and determines a is incompatible. It returns failure. Unify then returns failure. Extend invokes Add(a). As shown at 403, Add creates C, and creates a real binding between a and C. There are no children, so it just returns C. Extend(a) returns C. Minimal Extension cleans up, and is finished. The result is that a has been bound to C.

Figure 5A:
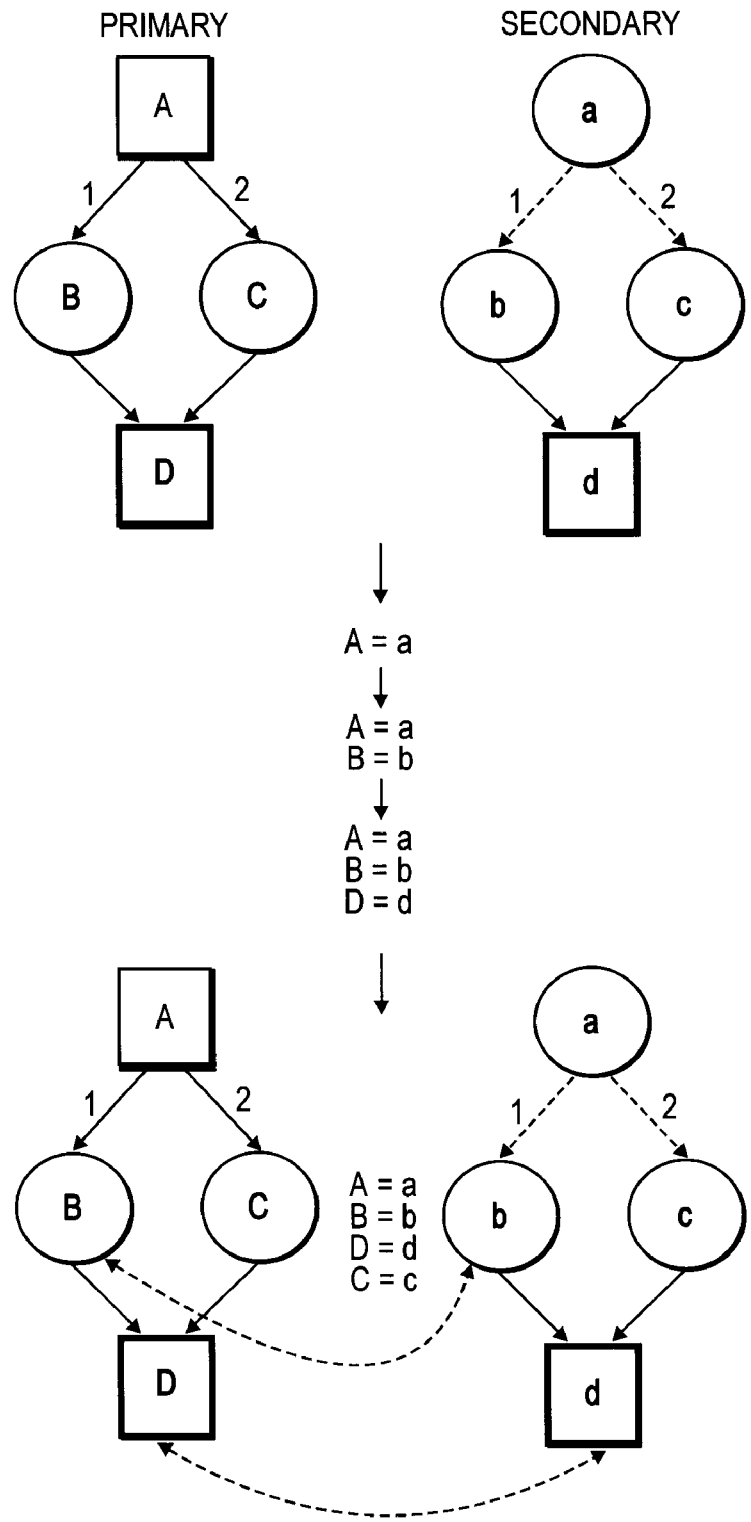
Figure 5B:
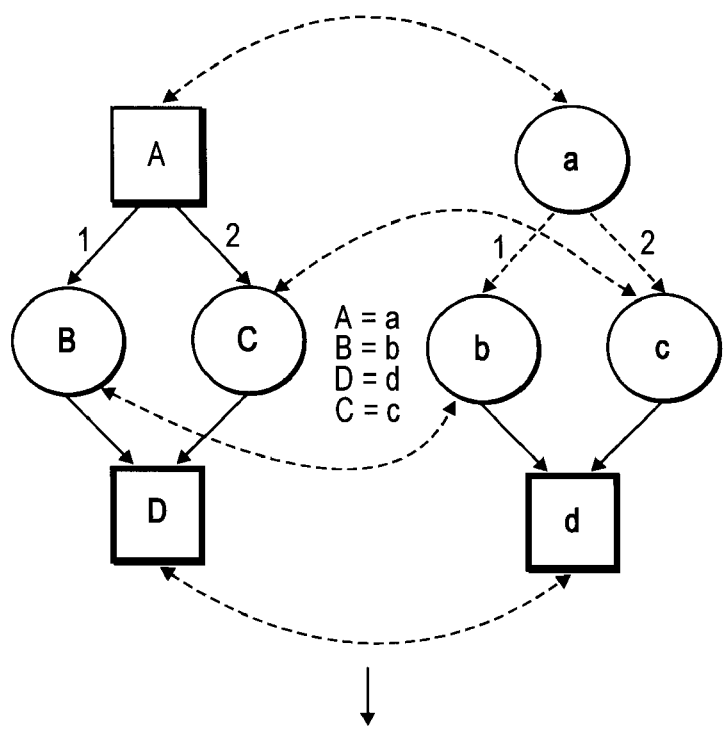
Figure 5B:
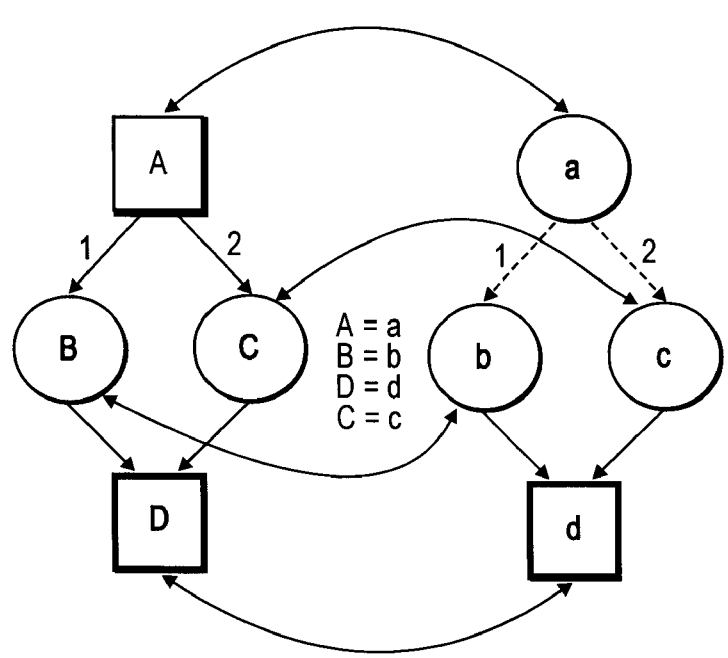

FIGS. 5A–B illustrate a complex example involving children. Assume a, b, c, and d are compatible with A, B, C, and D, respectively. Minimal Extension calls Extend(a). Extend calls Unify(a). Unify clears any virtual bindings, then looks at A, which is the same class as a, and calls Compare(A, a). Compare calls Compare1(A, a), which invokes A's node comparison function, and determines a is compatible. It stores the result of the comparison in the cache. It then iterates through each edge type descending from A. First it calls Compare(B, b). Compare calls Compare1(B, b), which invokes B's node comparison function, and determines b is compatible. It stores the result of the comparison in the cache. It then iterates through each edge type descending from B. It calls Compare(D, d). Compare calls Compare1(D, d), which invokes D's node comparison function, and determines d is compatible. It stores the result of the comparison in the cache. It then creates a virtual binding between D and d.

Popping the stack, Compare1(B, b) determines that B and b are compatible, and creates another virtual binding. Popping the stack, Compare1(A, a) checks the second edge, calling Compare(C, c). Compare calls Compare1(C, c), which invokes C's node comparison function, and determines if C is compatible. It stores the result of the comparison in the cache. It then iterates through each edge type descending from C. First it calls Compare(D, d). Compare finds that D is already bound, and it is indeed bound to d, so it returns success.

As illustrated in FIG. 5B, popping the stack, Compare1(C, c) determines that C and c are compatible, and creates another virtual binding. Popping the stack, Compare1(A, a) determines that A and a are compatible, and creates another virtual binding. Unify returns a's new binding, A, then calls Bind. Bind iterates through the virtual bindings, calling BindResource. BindResource creates a real binding for each virtual binding. Unify then returns A. Extend returns A. Minimal Extension then calls Extend(b); Extend calls Unify (b). Unify finds that b is already bound to B, so returns B to Extend, which returns B to Minimal Extension. Minimal Extension proceds similarly for C and d. The result is that all of the nodes in the secondary have been unified with the compatible nodes in the primary.

Figure 6A:
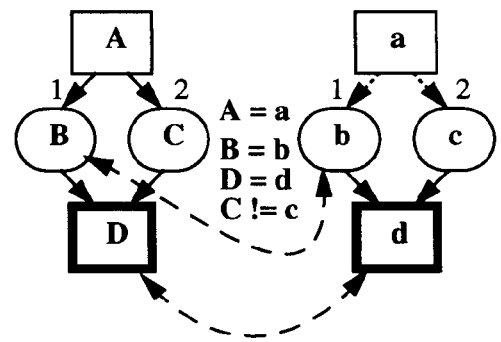
Figure 6A:
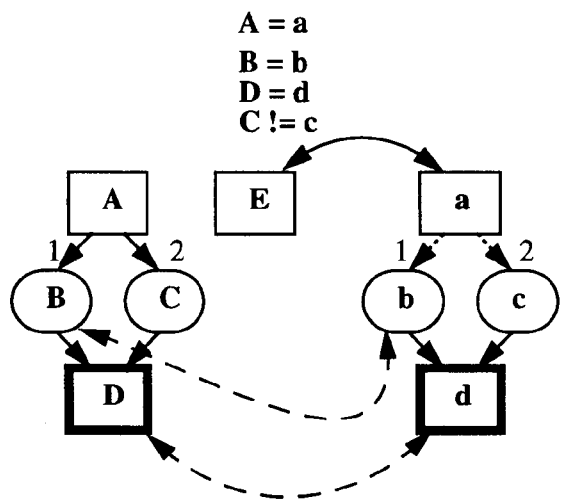
Figure 6A:
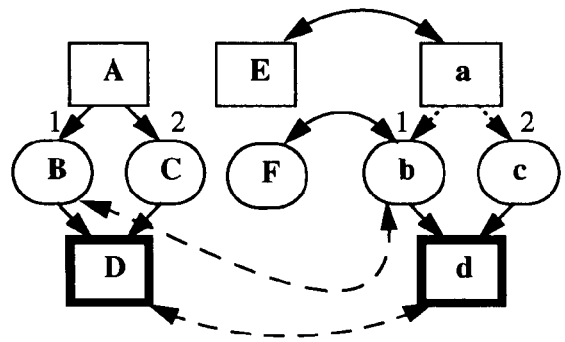
Figure 6A:
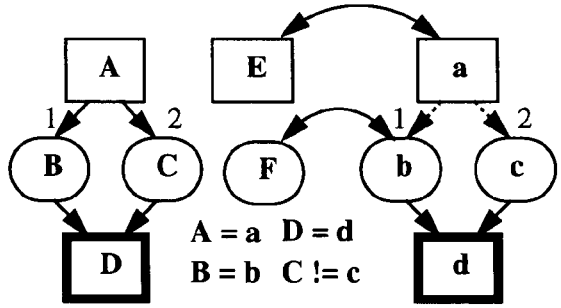
Figure 6B:
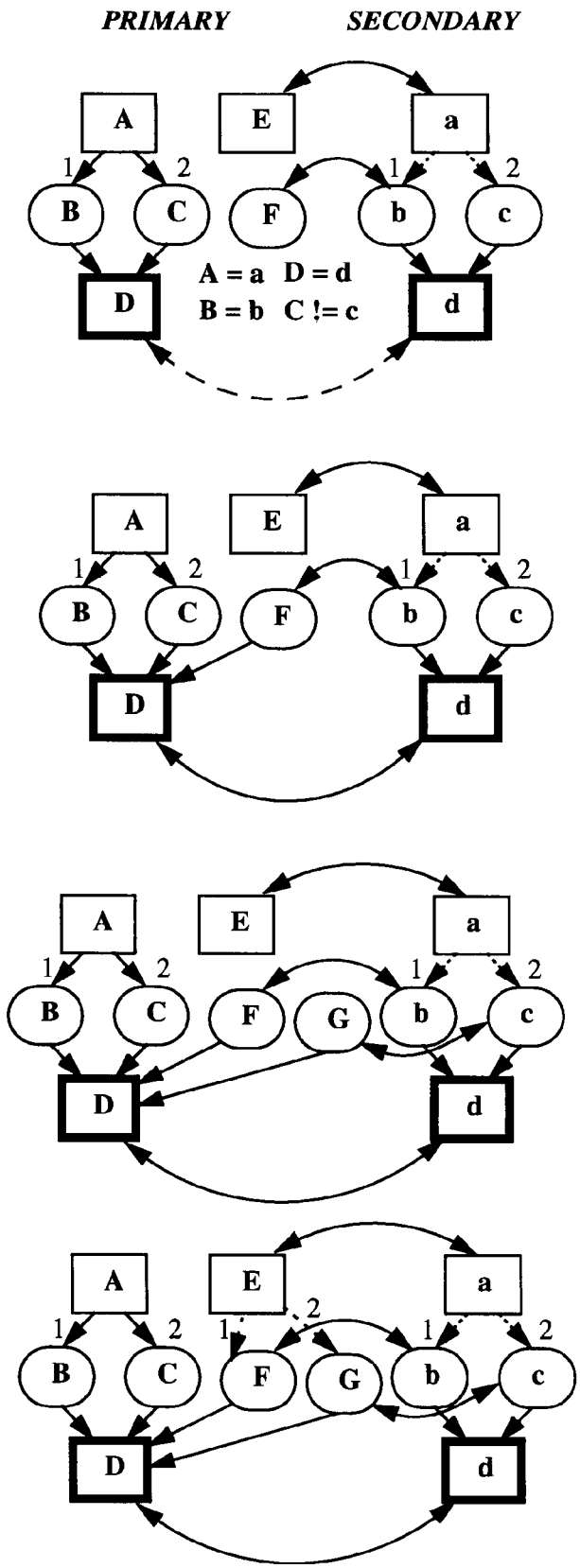

FIGS. 6A–B present the most complex example. Consider the same set-up as before, except that c is not compatible with C. The first few steps will proceed exactly as before, the difference coming when c is compared to C. Compare(C, c) calls Compare1(C, c), which invokes C's node comparison function, and determines C is incompatible. It stores the result of the comparison in the cache. It then returns failure. Compare(C, c) returns failure, causing Compare1(A, a) and Compare(A, a) to return failure. There are no more objects in the same class as a in primary, so Unify(a) returns failure.

Extend(a) invokes Add(a). Add creates a copy of a, called E, and creates a real binding between a and E. Add then iterates through each contained label of a, adding the children. It startes with Add(b). Add(b) creates a copy of b, called F, and creates a real binding between b and F. Add finds no contained children of b, so it extends primary with its used children, calling Extend(d) to add or unify the child. Extend calls Unify(d). Unify clears the virtual bindings, then finds that D is the same class as d, and calls Compare(D, d). Compare finds no real or virtual bindings, so calls Compare1 (D, d). Compare1 finds a cached comparison showing that D is compatible with d. There are no children of D, so it creates a virtual binding between D and d, and returns success. Compare(D, d) returns success.

Unify(d) calls Bind to create a real binding from the virtual binding, then returns D. Extend(d) returns D to Add(b). Add(b) then creates a new link from F to D, then returns F to Add(a). Add(a) records the name of label 1's copy, F, then calls Add(c) to add the other contained child. Add(c) copies C to G, creates a real binding, finds no contained children, and calls Extend(d) to add or unify the child. Extend(d) calls Unify(d), which finds that d is already bound to D, so returns D to Extend(d), which returns D to Add(c). Add(c) then creates a new link from G to D, then returns G to Add(a). Add(a) records the name of label 2's copy, G, finds there are no normal descendants, and creates the links from E to F and G. Add(a) finds no more descendants, so returns E to Extend(a), which returns E to Minimal Extension. The rest of the steps are similar to those in the previous example. As each node is found to be previously bound, Unify succeeds immediately. The result is that a's subgraph was found to be incompatible, so a, b, and C were copied, but since d was used, it was unified with D.

E. Improvements

In the above method, a step in Compare1 assumes that there is only one child of each label. It is the following step:

Invoke Compare on the children of the primary and secondary resource with the specified label In the case where there are multiple edges with the same label, this approach will not work. Also, during Compare1, the labels from the primary resource are looped through, not the secondary, this means that if the primary has more descendants of the appropriate type than the secondary, there will not be a match, which is not correct. The primary is allowed to have more than the secondary. Note that these are a result of the code mishandling multiple edges with the same label. The algorithm iterates over edge labels, not edges. Thus, since each edge label may correspond to multiple edges, an improved version would include another loop handling the resources with the same label.

In addition, if there are cycles in the graph, the method does not work, since it is is intended to work with acyclic graphs. But because of overloading of functionality with other parts of the resource code, resources which are not dependent from a consolidation point of view can appear in the list of dependent resources. For instance, a replication server may specify itself as its identifier or ID server.

Figure 7:
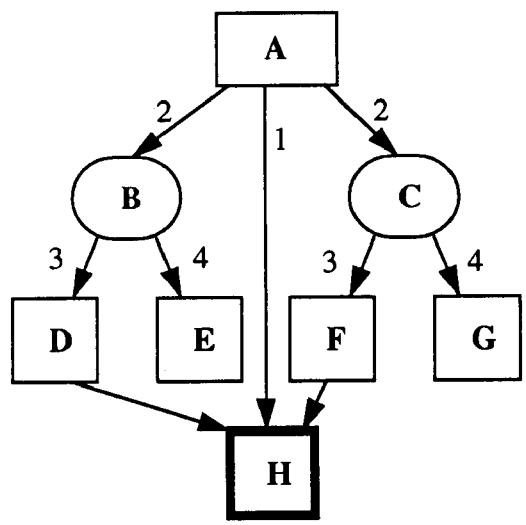
FIGS. 7–8 are diagrams illustrating the problem of using a single virtual bindings map.
Figure 7:
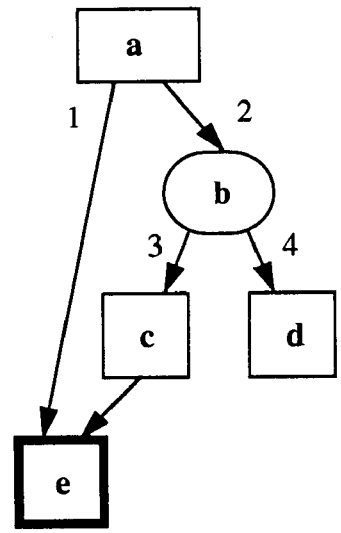
Figure 8:
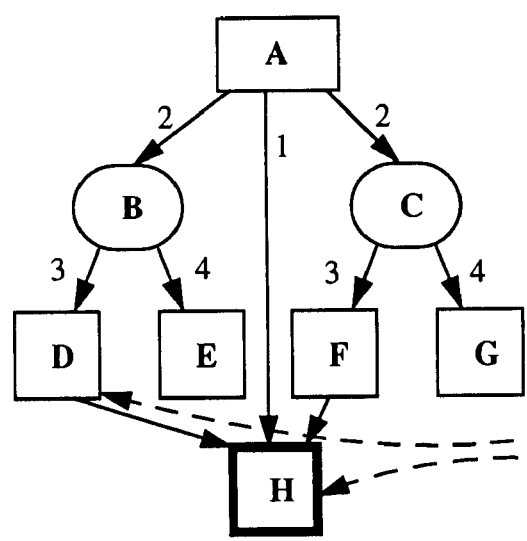
Figure 8:
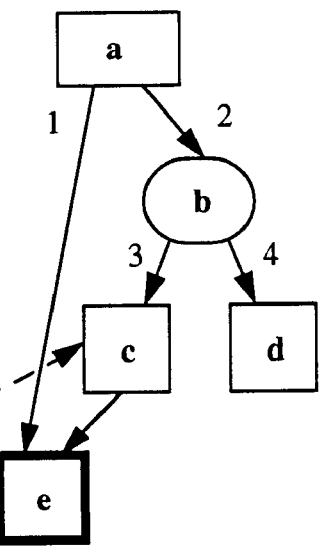

Finally, the use of a single virtual bindings map may be suboptimal. Consider the situation in FIG. 7. Assume that the e is compatible with H, and the subgraph rooted at b is compatible with those mapped at both B and C, with the exception of E, which is incompatible with d. Then the method will proceed by testing a against A, e against H, and establish a virtual link between e and H. Continuing to compare a's children, it will compare b against B, and C against D, and will establish another virtual link between C and D. It will then test d against E, but will find them incompatible, so Compare will return failure for B. The situation now appears as shown in FIG. 8. In the above-described implementation, the comparison would then fail completely, because it does not properly handle iterating through multiple links with the same label (i.e., it will not try b against A's other child 2, C).

If the algorithm implemented multiple links correctly, it would then test b's sub-graph against that rooted at C. It would find b and C compatible, and would then check C against F, but C still has a virtual binding to D. So Compare would fail, and Extend would end up copying the entire graph. The obvious reason this fails is because the virtual bindings were not erased when B's subgraph was found to be incompatible (instead, they would be erased the next time Unify was called). Erasing them when Compare fails would also cause an error, because then it would remove the necessary virtual link between e and H. The solution is to properly handle the backtracking as different links are tried, and erase just those virtual bindings that were added during the current level of recursion. This requires a more sophisticated data structure than the simple list of bindings currently used; instead, there should probably be stack of bindings that is pushed when Compare is entered, and popped when it is exited. The error does not currently manifest itself because it only occurs in rather sophisticated graphs (probably limited to those with multiple links with the same label).

F. Efficiency

The algorithm may be optimal in the number of node comparisons that it does, but the overhead is probably substantial. The following changes may reduce the overhead. Minimal Extension should call Extend only on root nodes. Above, it calls Extend on all the nodes in the secondary graph. But when Extend processes a root node, all the other nodes in the subgraph also get bound. Thus, there is no need to call Extend on the subgraph elements again. Note that the first thing Unify does is check to see if there is already a binding, so it will come back immediately for subgraph nodes, but it might be better not to process them in the first place. On the other hand, it is possible that the cost of finding the root nodes would outweigh the benefits. Note that the check for an already-bound node would need to remain in place, since, for example, two root nodes might point at the same child node.

One of the points mentioned in the discussion of the subtleties of the method was the fact that newly-added nodes in primary should not be considered candidates when trying to Unify nodes from secondary. The implementation does not make this check. Because nodes are bound when they are added, they will never successfully compare, so the method will not handle this incorrectly, but it is an unclear artifact of the implementation, and a potential source of extra overhead.

G. Conceptual Problems

The method described above marks the edges as being used or contained. It would make more sense for nodes to be marked as used or contained Consider that it makes no sense for a node to be contained by some resources but used by others. Seen from this light, the semantics of contain vs use is simple: contained nodes can only have one parent, whereas used nodes can have multiple parents. It may simplify or clarify the algorithm to reflect this interpretation in the resources.

Another problem is that the method by itself does not completely guarantee the topological compatibility—one of the topological checks is implemented by the node comparisons. For instance, suppose that in FIG. 2, a and A were not compatible. Then when C is consolidated, E is still available, and C conceivably could be consolidated with E. Because E has a parent, but C is a root node, they should not be considered topologically compatible. This problem does not show up because in cases where this is possible, the nodes have something like a usage attribute that makes the nodes incompatible. Since Minimal Extension's job is to handle the topological comparison, it should handle this case, instead of relying on the node comparisons to handle it H. Implementation Problems The use of two lists to represent the real and virtual bindings is not optimal. Specifically, the duplicated code in Compare is suboptimal. One solution is to change the representation to a list of bindings, and another list that indicates whether each binding is real or virtual.

A related problem is that virtual bindings are cleared at the beginning of Unify, as mentioned above. Instead, they should be cleared when a real binding is established. This is a simpler change than actually fixing the bindings to track the level of backtracking. Ideally, Add would not bind resources together itself, rather than calling BindResource. Also, information from tcf_hierarchy should ideally be derived from information in the individual classes.

I. Better consolidation

The goal of Minimal Extension is to minimally consolidate the resources from secondary. A standard heuristic used to minimize resource usage is to consolidate larger resources before smaller resources. Minimal Extension uses tc_f_hierarchy to implement this heuristic, by specifying the class order in which to do the consolidation. The particular ordering comes from assuming that subgraphs with more nodes (e.g., SQL servers) should be consolidated before subgraphs with fewer nodes. There are two problems with using tcf_hierarchy: it does not handle multiple subgraphs of the same type, and the assumption is not always true. For the first case, consider a resource set with two SQL servers; one is normal, the other has an extra p device of size 100. Based on the above heuristic, the second server should be handled first. But since they are both SQL servers, they will not be distinguished by tc_f_hierarchy, and will be handled in an arbitrary order.

For the second case, consider that l devices are handled before p devices. This normally makes sense, since an l device requires a SQL server, and all that goes with it. But suppose there is a resource set in which a p device requests 500 megabytes. If the current minimal set already has such a device, it would be better for the consolidation to handle it first, but instead, the l device's p device will probably be consolidated. One possible solution to both of these problems is to provide a dynamic weighting scheme. Minima Extension could call a procedure which dynamically calculates the order in which the nodes should be handled. Ideally, it would provide only the root nodes. A simple scheme might base the weight on the number of nodes in the subgraph; this solution would handle the first case above, but not the second. A more powerful scheme could assign a weight to each type of resource; for instance, each 10 megs of p device might cost 1 point, each process might cost 10, each machine might cost 50. Such an approach would allocate 50 points to the above 500 meg p device, but only about 13 to the typical SQL server, so the p device would be allocated first.

Note that it is still possible for the approach to get into trouble; doing perfectly optimal resource consolidation in the general case is NP-complete, and all possibilities are not tried, in some cases problems will occur. By using an appropriate weighting algorithm, it should be possible to reduce the cost of some scenarios that now cause problems. Furthermore, by changing the weights, the method can be adjusted for different requirements (e.g., minimizing the amount of disk space, rather than the number of machines).

J. Other Notes

There are some aspects of the method that have not been explained, because they are related to the specific application of the graph algorithm to the resource tree. One point which benefits from further explanation is the following step in Bind.

Do any resource-specific merging of the two resources

"Merging" a node in the secondary graph into the primary graph means updating the primary resource so that it incorporates information from the second resource. This step is required because compatibility between two resources does not mean they are identical. For instance, two p devices may be otherwise identical, but have different sizes. Unless there is an attribute that specifically prevents them from being merged, they can be considered compatible (because whatever can be done with the smaller resource can also be done with the larger). But if the primary resource is the smaller, it must be increased in size so that it can contain the larger. This merging is accomplished through the merge method on the given resource. Note that when a node is copied through Add, as opposed to unified through Unify, it does not require a merge.

There have been references to "node comparisons", meaning the node-specific mechanism that is used to determine if two nodes are directly compatible. The comparison is done in the resource-specific compare method (this method is distinct from a resource set's compare method, which implements the Compare routine described above). A resource class implements compare as a comparison between the attributes. In an earlier version of the Resource Consolidation method, each resource comparison included comparisons of its dependent resources; although this made the code simpler, it did not allow the possibility of Compare1 caching the results.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A computer-implemented resource consolidation method comprising:

representing resources hierarchically in graphs, each graph having a topology for indicating dependencies and compatibilities between individual resources;

receiving a request to consolidate resources from a first and second set of resources, the sets being represented as primary and secondary graphs, respectively; and determining a consolidated resource set by iteratively extending the first set in a minimal fashion, by performing substeps of:

(i) sharing nodes of the secondary graph with that of the primary graph wherever the graphs are compatible, and (ii) otherwise, adding contents of the secondary graph to the primary graph, said substeps being performed such that topology of the secondary graph is retained.

2. The method of claim 1, wherein the method initially starts with an empty initial resource set, corresponding to said first set of resources, and then iteratively extends that set in a minimal fashion.

3. The method of claim 2, wherein upon completion of iteration, said first resource set comprises sufficient resources.

4. The method of claim 1, wherein said determining step includes:

iterating through each node in the secondary graph; and determining whether to extend the primary graph to contain said each node.

5. The method of claim 1, wherein said determining step includes:

checking whether a given node of the secondary graph is compatible with a corresponding node in the primary graph.

6. The method of claim 5, wherein said checking step further includes:

checking whether descendants of said given node of the secondary graph are compatible with descendants of said corresponding node in the primary graph.

7. The method of claim 6, wherein said step of checking descendants is performed in a recursive manner.

8. The method of claim 1, wherein a node of the secondary graph that is found to be not compatible with a node of the primary graph is added to the primary graph from the secondary graph by:

copying the node from the secondary graph to the primary graph; and minimally extending the primary graph to include descendants of the node.

9. The method of claim 8, wherein said step of minimally extending the primary graph to include descendants of the node from the secondary graph is performed in a recursive manner.

10. The method of claim 1, wherein each node is associated with a class.

11. The method of claim 10, wherein nodes of the same class are compatible.

12. The method of claim 1, wherein the method tracks which primary nodes have already been mapped, so as to avoid mapping multiple nodes in the secondary graph onto the same node in the primary graph.

13. The method of claim 1, further comprising:

recording all descendant mappings once a node has been mapped from the secondary graph to the primary graph, so as to preserve topology of the secondary graph.

14. The method of claim 1, wherein when two nodes are found to be compatible, the two nodes are bound together.

15. The method of claim 1, wherein the order in which nodes are compared is selected to avoid re-comparing nodes.

16. The method of claim 1, wherein a predefined order is employee for comparing classes of nodes, so as to improve the likelihood that classes with more descendants get mapped first.

17. The method of claim 1, wherein a set of virtual bindings is employed which stores potential mappings while nodes are being compared, such that if a comparison is successful the virtual bindings are converted into real bindings.

18. A computer-implemented method for consolidation of resource sets, the method comprising:

representing sets of resources hierarchically in graphs, said graphs having a topology for indicating attributes of resources;

receiving a request to consolidate resources from a first set of resources being represented as a primary graph, and a second set of resources being represented as a secondary graph;

evaluating segments of the secondary graph to determine if said segments of the secondary graph are compatible with segments of the primary graph;

if a given segment of the secondary graph is determined to be compatible with a particular segment of the primary graph, binding said given segment of the secondary graph to said particular segment to share resources; and otherwise, extending said primary graph by said given segment of said secondary graph.

19. The method of claim 18, wherein a segment includes a given node of a graph and descendants of said given node.

20. The method of claim 19, wherein descendants of said given node describe attributes of a resource.

21. The method of claim 18, wherein said step of evaluating segments includes:

iterating through each segment of the secondary graph; and determining whether said segment is compatible with any segment of the primary graph.

22. The method of claim 18, wherein said step of evaluating segments comprises comparing the attributes of resources.

23. The method of claim 18, wherein said step of evaluating segments includes evaluating segments in a predefined order.

24. The method of claim 21, wherein said predefined order is based upon number of members of a segment.

25. The method of claim 18, wherein said step of evaluating segments includes employing virtual bindings for storing potential bindings while segments are being compared, such that if a comparison is successful the virtual bindings are converted into real bindings.

26. The method of claim 18, wherein said step of binding said given segment of the secondary graph to said particular segment comprises updating a resource in the said first set of resources to incorporate information from a resource in said second set of resources.

27. The method of claim 18, wherein segments of the primary graph that have been bound to segments of the secondary graph are marked, so as to avoid mapping multiple segments of the secondary graph onto the same segment of the primary graph.

28. The method of claim 18, further comprising:

recording all descendant mappings after a given segment has been added from the secondary graph to the primary graph, so as to preserve topology of the secondary graph.

29. The method of claim 18, further comprising:

retaining results of segment comparisons, to prevent repeated comparisons of the same segments.

* * * * *